June 21, 1932.   R. CHILTON   1,864,170
GEAR MECHANISM
Filed Jan. 24, 1931   3 Sheets-Sheet 3

INVENTOR
Roland Chilton
BY
ATTORNEYS

Patented June 21, 1932

1,864,170

UNITED STATES PATENT OFFICE

ROLAND CHILTON, OF RIDGEWOOD, NEW JERSEY

GEAR MECHANISM

Application filed January 24, 1931. Serial No. 510,882.

This invention relates to reduction gear mechanisms and more particularly to high ratio gear trains.

Certain features of the invention are particularly applicable to gear trains such as are required in starters for air-craft engines. Gear ratios of the order of 100:1 may be advantageously used in the starters for air-craft engines such as illustrated in this application. The torque capacity requirements for such starters are relatively high particularly in starting the large multicylinder engines at low temperatures.

One object of the present invention is to produce a reduction gear mechanism having a high torque capacity and a minimum of bulk and weight which may be manufactured at a relatively low cost.

To reduce the maximum gear size, the necessary reductions are, in the present practice, sometimes split up over three or more steps or reductions whereby the losses in efficiency are multiplied. Alternatively, by the use of pinions with very few teeth, the necessary reduction has been obtained in a simple two-step train but special precautions are necessary to compensate for torsional and bending deflections to which such slender pinions are subject.

Another object of the present invention is to provide in a gear mechanism of the class referred to above, a new, improved and simplified construction and arrangement for uniformly distributing the drive loads over a plurality of sets of relatively light gears whereby unusual aggregate driving capacity may be realized relatively to the weight and bulk of the parts.

In the present construction a plurality of gears engaging the driving pinion and a plurality of gears engaging the driven gear are employed as an expedient for multiplying the driving capacity of light gears. These gears constitute elements of independent gear trains connecting the driving pinion and the driven gear. The drawings of the present application show a quadruple driving means between the driving pinion and the driven gear. The number of gears through which the driving load is transmitted may be varied however to suit the requirements of any installation.

It will be readily seen that, with a plurality of gears in the same plane engaging a pinion, the number of gears which may be arranged to mesh with the pinion without interference is limited. In the present construction and arrangement, the gears engaging the small driving pinion are arranged in pairs, the gears of each pair being located in the same plane and being offset axially of the driving pinion relatively to other pairs. This arrangement enables the gears of one pair to overlap the gears of another pair without interference, and the gears engaging the pinion afford multiple strength as compared with a single gear of the same dimensions.

When several countershafts carrying gears having a fixed relation, are disposed in parallel to transmit the drive between a common driving pinion and a common driven gear, the angular relationship between the countershaft gear teeth and the countershaft pinion teeth and the location of the countershaft bearings must be accurately determined in manufacture and maintained in assembly and operation if the load is to be uniformly distributed between the several gears. Even should such initial accuracy be obtained, operation deflections in the gears or other parts are liable to throw a preponderance of the load upon a few of the engaged teeth.

Another object of the invention is to provide, in a reduction gear mechanism of the character described, means simple in construction and easy to manufacture, by which the angular relationship of the several gears may be readily determined after initial assembly with the parts in deflected condition corresponding to the normal working load.

To this end each of the gear trains connecting the driving pinion and the driven gear is so constructed that a slip connection may be provided in each gear train when the mechanism is initially assembled and each of these connections is tightened while or after the mechanism is subjected to driving load. In the particular construction shown, each countershaft pinion is drivably secured to the associated gear by a slip connection which, when the parts are initially assembled, leave these gears free to assume any angular relationship to the respective pinions. This connection is first adjusted to slip at about the driving load encountered by the mechanism in use, and is locked, while or after being subjected to such load. This will automatically "set" the parts of the mechanism each to take a proportionate share of the load. This provision makes it unnecessary to locate the countershaft bearings with extreme accuracy and no accurate predetermination of the angular relationship between the pinion and gear teeth is required. The overloading of any one gear is thus avoided in spite of slight variations and deflections between the parts.

With these and other objects in view the invention comprises the novel and improved features, constructions and combination of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Figure 1:
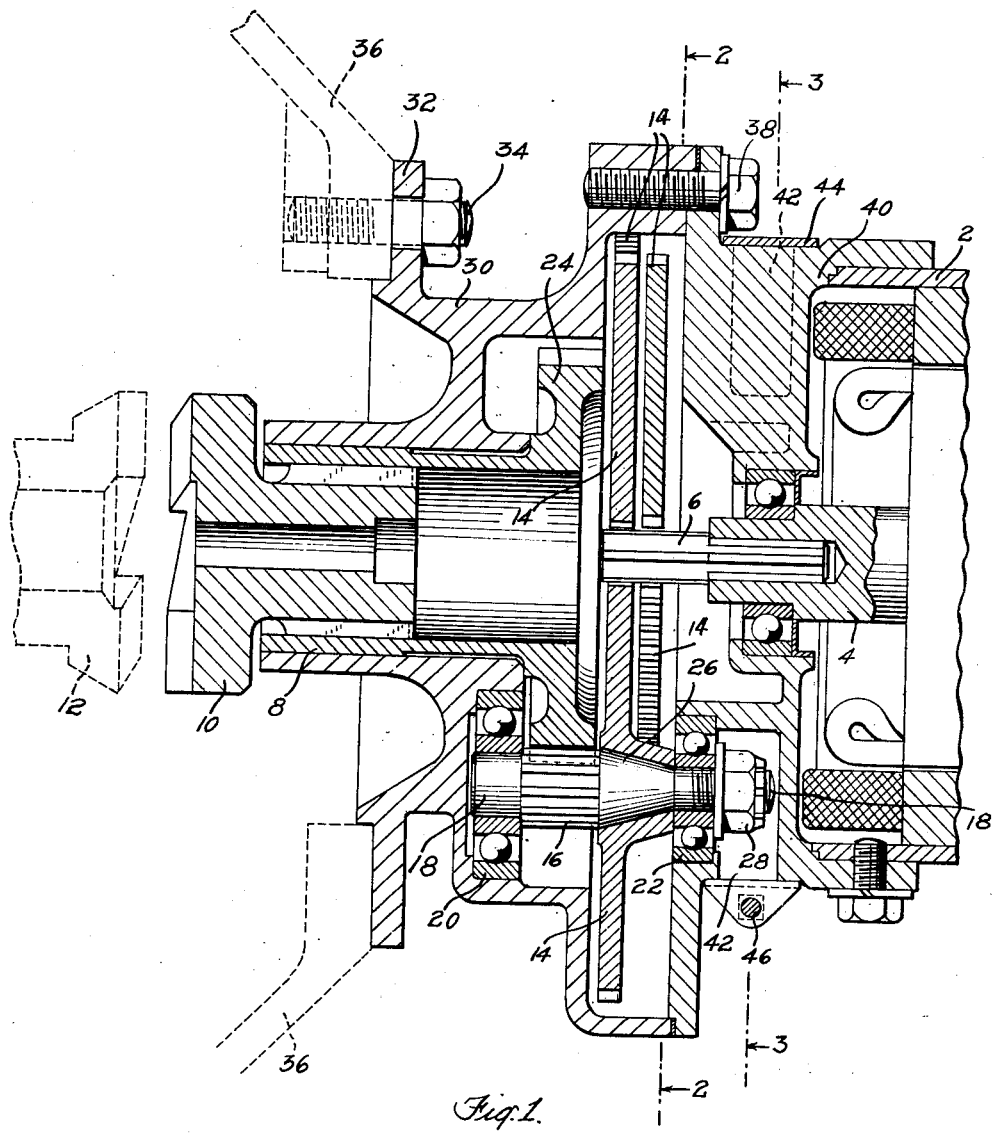
Fig. 1 is a view in axial section illustrating a mechanism embodying the invention.

As above stated, the invention is illustrated in this application as applied to an engine starting mechanism for internal combustion engines. This starting mechanism comprises an electric motor 2 having an armature shaft 4 in one end of which is secured the small high speed driving pinion 6. This pinion is arranged to drive at low speed through a high ratio gear train a sleeve 8 within which is keyed to slide longitudinally thereof an engine-engaging jaw 10 arranged to engage the starting jaw 12 mounted on the crank shaft of the engine. The high ratio gear train through which the sleeve 8 is driven from the pinion 6 comprises a series of gears 14 preferably of substantially the same diameters and each meshing with the pinion 6. Each of these gears has a very large diameter as compared with the diameter of the pinion 6, and as shown in the drawings lines radial to the pinion 6 drawn tangent to the peripheral line of a gear will include an angle greater than $$\frac{360°}{\text{number of gears}}$$

Figure 2:
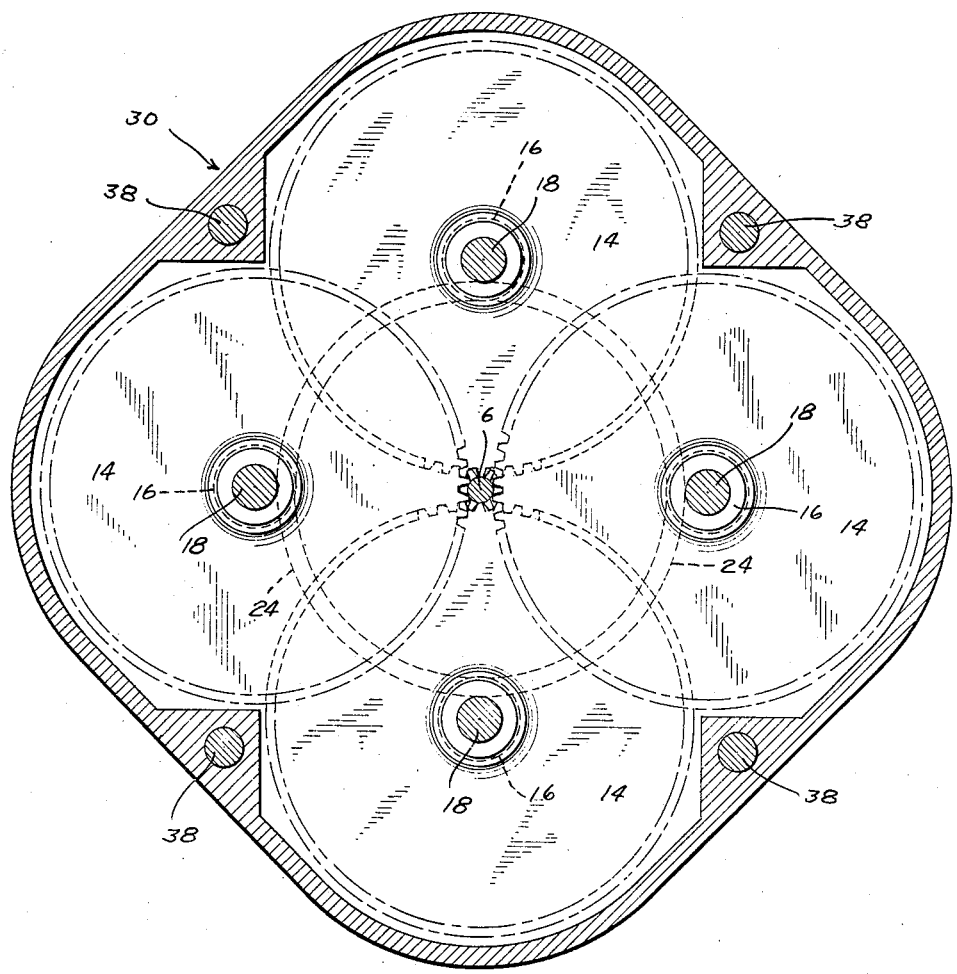
Fig. 2 is a sectional view taken substantially on the line 2—2 of Fig. 1.
Figure 3:
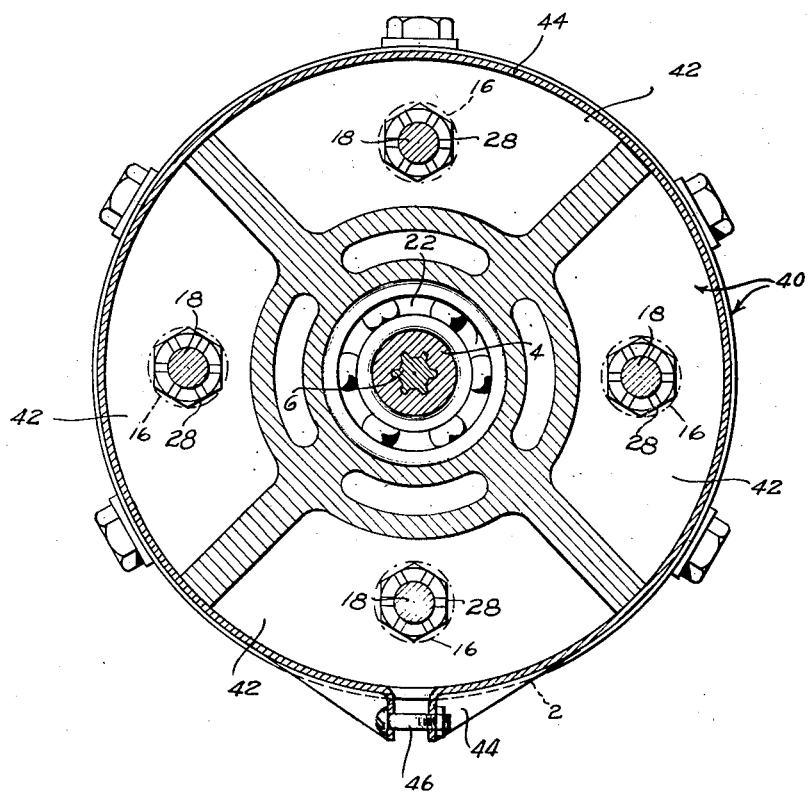
Fig. 3 is a sectional view taken substantially on the line 3—3 of Fig. 1.

In order to avoid interference, the gears are arranged in pairs, the gears of each pair lying in the same plane and the gears of one pair overlapping the gears of the other pair as shown clearly in Figure 2. As shown in Figure 1, the pairs of gears are offset longitudinally of the pinion 6.

Each of the gears 14 is secured to a counter shaft 18 which carries a small gear or pinion 16 preferably formed integral with the shaft, the ends of which shaft are supported in anti-friction bearings 20 and 22 in the frame of the mechanism. Each of the pinions 16 meshes with a gear 24 secured to and preferably formed integral with the sleeve 8.

Each of the gears 14 is connected with the corresponding pinion 16 by a construction which will enable the gears to be left free to turn with the relation to the respective pinions when the mechanism is first assembled. The gears 14 may then be slightly rotated from the motor while the gear 24 and the pinions 16 are held from rotation and the gears 14 may be thereafter fixedly secured respectively to the shafts 18 and to the pinions 16. In the construction shown each of the countershafts is provided with a tapered or conical portion 26 upon which is mounted the correspondingly shaped hub of the gear 14. The hub of the gear is secured on the tapered portion 26 by the engagement with one end of said hub of the inner ring of the anti-friction bearing 22 which is held in position on the shaft 18 by a nut 28 engaging a washer contacting with the outer side of the said ring.

The sleeve 8 which carries the gear 24 is mounted in a bearing in a housing 30 having a peripheral flange 32 which is secured by bolts 34 to a portion 36 of the casing of the engine to which the starter is applied. Secured to the casing or housing 30 by bolts 38 is a cover member 40 which constitutes a supporting member for the motor. The bearings 20 and 22 for the respective shafts 18 are mounted respectively in the casing 30 and in the cover member 40 as shown in Figure 1 and the cover member is provided with a series of recesses 42 into which the ends of the shafts 18 which carry the nuts 28 project. When the assembly is complete these recesses are covered by an annular band 44 secured in place by a bolt 46.

The starter may be completely assembled except for the band 44 with the nuts 28 loose on the shafts 18 so that the gears 14 are free to turn on the tapered portions 26 of the shafts. With the gears free to rotate with relation to the pinions, the teeth of the various gears may be readily meshed.

It should be noted that if each of the pinions 16 and the corresponding gear 14 were secured to rotate together by a key or similar connection, the angular relationship of each gear and pinion when assembled would be predetermined and any angular error between any one of the gears and the corresponding pinion would tend to throw all the load on one of the gears.

With the construction above described the teeth of the several gears may be meshed at random and the gears 14 subsequently secured to the shafts 18 and to the pinions 16 by tightening the nuts 28. During the setting of the gears 14 with relation to the pinions 16 the jaw 10 is preferably locked against rotation and a gradually increasing turning moment is applied to the armature shaft 4. At the same time the nuts 28 are progressively tightened until all slippage between the gears 14 and pinions 16 is eliminated. With the parts set in this manner all of the gears will bear an equal part of the load in spite of deflections in themselves and in the supporting structure.

In the operation of the starter the starter jaw 10 is meshed by suitable means (not shown) with the engine jaw 12 when the motor 2 is energized. The pinion 6 drives the sleeve 8 through the high ratio gear trains each comprising the gears 14, 16 and 24. The sleeve 8 drives the starter jaw 10 which rotates the crank shaft of the engine until the engine starts. The starter jaw 10 is then automatically demeshed from the jaw 12 in the usual manner by the over-run of the engine through the action of the inclined faces of the teeth of the jaw 12, with the inclined faces of the teeth of the starter jaw 10.

It will be seen that the use of a large number of gear trains connecting the driving with the driven gear, in the present invention, enables a corresponding reduction to be secured in the individual tooth loads with the result that light gears having teeth of fine pitch for engagement with the driving pinion may be employed.

In the present construction the difficulty usually experienced in uniformly distributing the load between a plurality of gears acting in parallel has been overcome without necessitating excessive accuracy in manufacturing and assembly.

It is to be understood, that, except as defined in the claims, the invention is not limited to the illustrated form of the invention but that the invention may be embodied in other forms within the scope of the claims.

Having explained the nature and object of the invention and having specifically described a construction embodying the invention in its preferred form, what is claimed is:

1. A reduction gear mechanism comprising a high speed gear, a series of transmission gears meshing with said high speed gear, a low speed gear, a second series of transmission gears, one for each of the gears of the first series, meshing with said low speed gear, slip connections between the corresponding transmission gears and means for tightening said connections against slippage in operation.

2. A reduction gear mechanism comprising a high speed gear, a low speed gear, a plurality of independent gear trains between said high speed gear and said low speed gear, each having a slip connection to allow the presetting of the gears for equal tooth loads, and means for tightening said connections against slippage when the gears have been preset.

3. A method of setting gears in a system comprising a high speed gear, a low speed gear and a plurality of independent sets of gears between said high speed gear and said low speed gear which consists in assembling said high and low speed gears and said gear sets with a slip connection in each gear set, rotating the high speed gear with relation to the low speed gear so as to cause a slip in each of said slip connections, and thereafter tightening said slip connections.

4. A method of setting gears in a system comprising a high speed gear, a series of transmission gears meshing with said high speed gear, a low speed gear, a series of transmission gears meshing with said low speed gear and slip connections between the respective transmission gears of the first series and the transmission gears of the second series which consists in assembling said high speed gear, said low speed gear and said transmission gears with the transmission gears of the first series free to slip respectively with relation to the transmission gears of the second series, rotating the high speed gear with relation to the low speed gear so as to cause said connections to slip, and thereafter gradually tightening said connections.

Signed at New York, New York, this 20th day of January, 1931.

ROLAND CHILTON.